United States Patent
Kagitani

(10) Patent No.: US 7,529,401 B2
(45) Date of Patent: May 5, 2009

(54) IMAGE PROCESSING APPARATUS AND IMAGE PROCESSING METHOD

(75) Inventor: Kenji Kagitani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 843 days.

(21) Appl. No.: 10/954,190

(22) Filed: Oct. 1, 2004

(65) Prior Publication Data

US 2006/0013472 A1    Jan. 19, 2006

(30) Foreign Application Priority Data

Oct. 2, 2003  (JP) ............................. 2003-344728
Aug. 24, 2004 (JP) ............................. 2004-244404

(51) Int. Cl.
*G06K 9/00* (2006.01)

(52) U.S. Cl. ...................... 382/154; 382/106

(58) Field of Classification Search ....................... None
See application file for complete search history.

(56) References Cited

U.S. PATENT DOCUMENTS 4,488,245 A * 12/1984 Dalke et al. ................. 382/167
6,519,358 B1 * 2/2003 Yokoyama et al. ........... 382/154
6,671,399 B1 * 12/2003 Berestov ...................... 382/154
2001/0014171 A1 * 8/2001 Iijima et al. .................. 382/154
2003/0228053 A1 * 12/2003 Li et al. ....................... 382/154

FOREIGN PATENT DOCUMENTS

JP     2002-56407      2/2002
JP     2002-324249     11/2002

* cited by examiner

*Primary Examiner*—Matthew C Bella
*Assistant Examiner*—Alex Liew
(74) *Attorney, Agent, or Firm*—Oblon, Spivak, McClelland, Maier & Neustadt, P.C.

(57) ABSTRACT

An image processing apparatus includes an image input unit that inputs binocular stereoscopic image data including plane image data for both eyes from an arbitrarily set viewpoint, a plane-image creating unit that creates plane image data based on the binocular stereoscopic image data, a distance determining unit that determines distances from a single viewpoint at the time of viewing a binocular stereoscopic image based on the binocular stereoscopic image data to each of a plurality of points in a three-dimensional space, an image correcting unit that corrects the plane image data using distance information about the each of the points in the three-dimensional space, and an image output unit that outputs the plane image data.

25 Claims, 11 Drawing Sheets

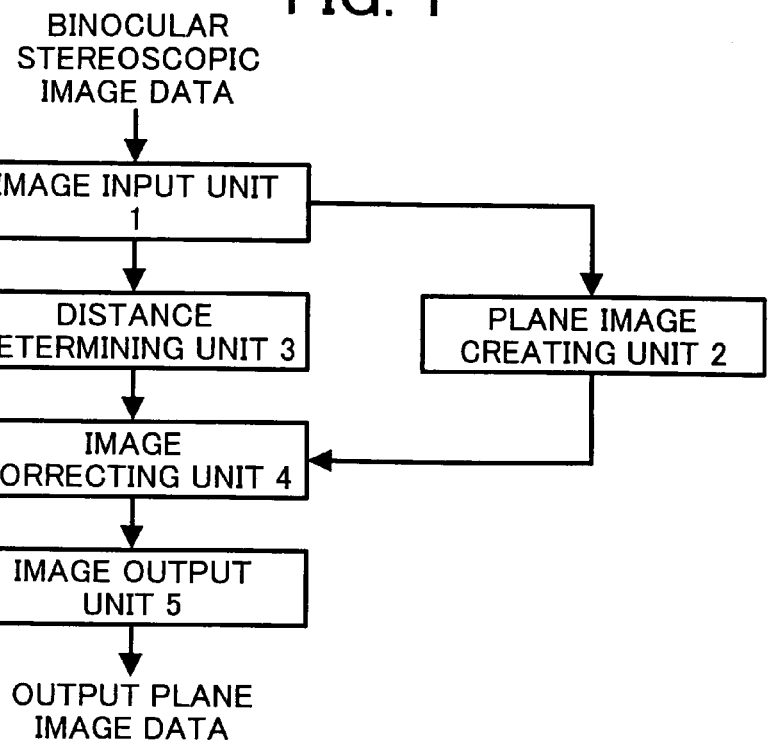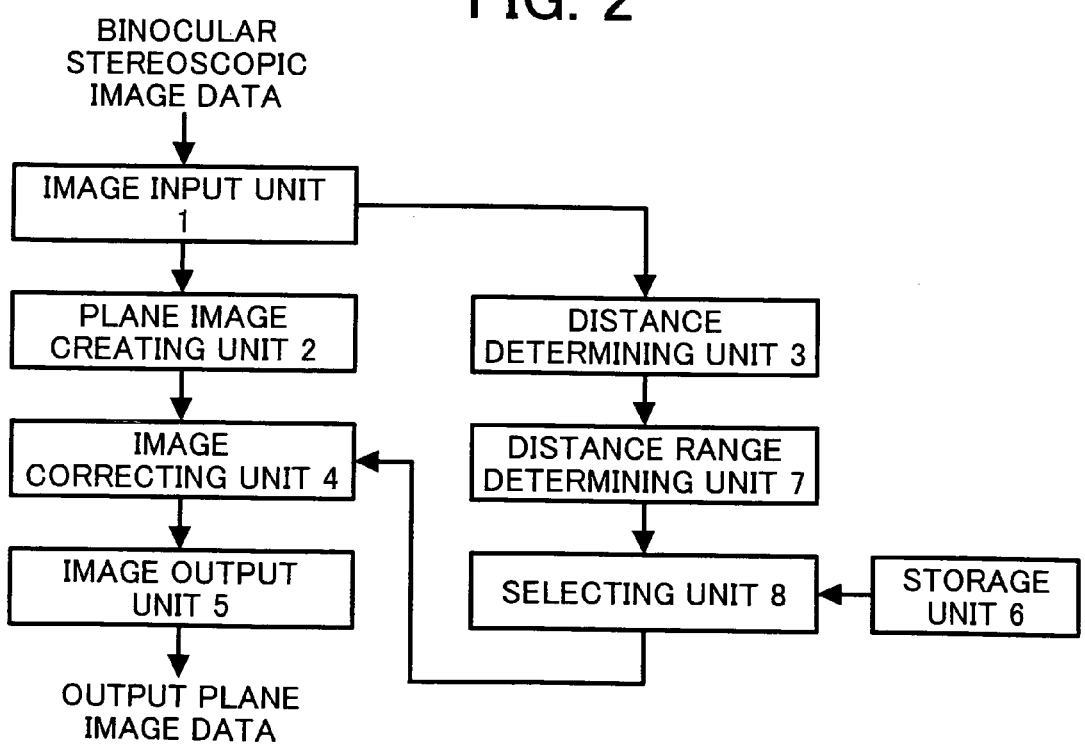

FIG. 8
(a)
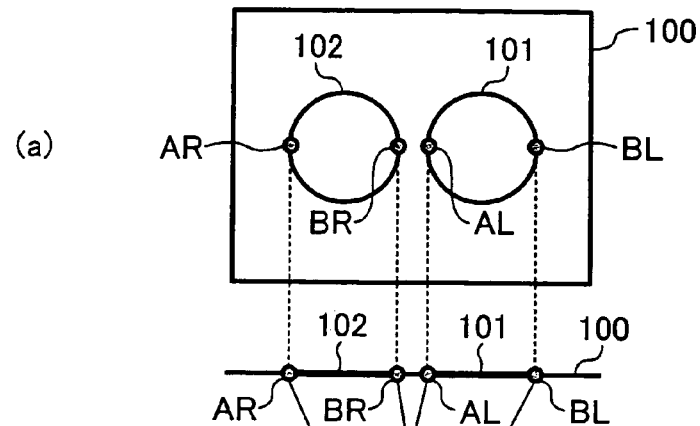
(b)
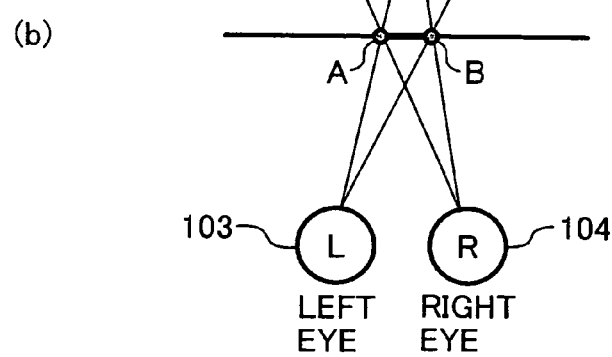
(c)
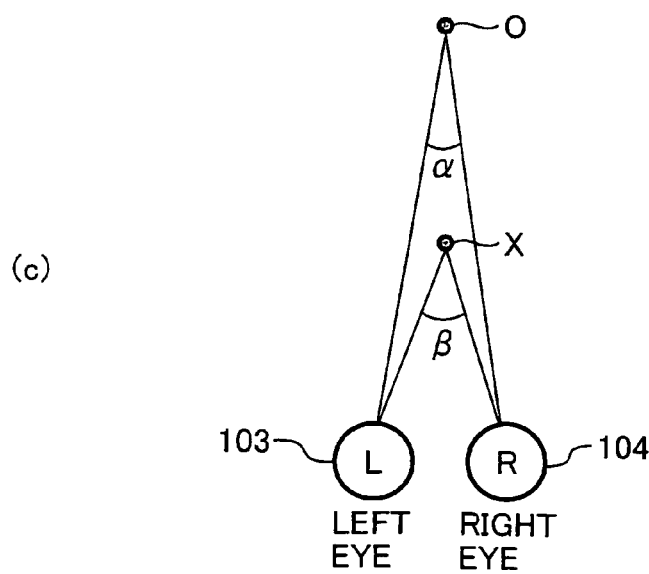

PARALLAX BARRIER 106
LEFT EYE L 103
RIGHT EYE R 104
IMAGES $L_1$ TO $L_5$
IMAGES $R_1$ TO $R_5$

IMAGE PROCESSING APPARATUS AND IMAGE PROCESSING METHOD

CROSS-REFERENCE TO RELATED APPLICATIONS

The present document incorporated by reference the entire contents of Japanese priority documents, 2003-344728 filed in Japan on Oct. 2, 2003 and 2004-244404 filed in Japan on Aug. 24, 2004.

BACKGROUND OF THE INVENTION

1) Field of the Invention

The present invention relates to an image processing apparatus and an image processing method that create a plane image from binocular stereoscopic image data including plane image data for right and left eyes viewed from a viewpoint set arbitrarily.

2) Description of the Related Art

Conventionally, one of three-dimensional image display methods for enabling binocular stereoscopic vision separates images for left and right eyes including images viewed from different viewpoints for right and left eyes of a viewer, and gives binocular parallax to the viewer so as to enable stereoscopic viewing. As a method of creating a plane image from an arbitrary viewpoint based on such images, Japanese Patent Application Laid-open No. 2002-324249 and Japanese Patent Application Laid-open No. 2002-56407 discloses a method of creating a plane image that can be seen naturally in geometry at that time of viewing an image.

FIG. 5 is a block diagram of a main part of a conventional image processing apparatus. The conventional image processing apparatus includes an image input unit 1, a plane-image creating unit 2, and an image output unit 5. The image input unit 1 receives, for example, binocular stereoscopic image data including plane image data for right and left eyes from an arbitrary set viewpoint as an input. The plane-image creating unit 2 converts all the input binocular stereoscopic image data into plane image data by an image processing method as a conventional technique so as to output them. In the conventional image processing apparatus, therefore, the plane image data created by the plane-image creating unit 2 are not corrected at all.

When the plane image is created from the binocular stereoscopic image, however, if a photographing condition of a binocular stereoscopic image input device at the time of photographing is not right, for example, exposure is insufficient or white balance is not right. In this case, there occurs an unnatural image.

Since an image of close view includes many comparatively high spatial frequency components, many operations are required for making the image quality of close view high. A speed of the operations is, therefore, reduced, and the apparatus becomes larger. Since an image of distant view includes many comparatively low spatial frequency components, such a process is not necessary.

When an image such that a person in front of a flesh-colored wall, for example, is displayed or output by an image display device such as a monitor or an image forming device such as a printer, if the background and the person are subject to the same image process, the color of the person's skin turns to be different from a color conceived by people as ideas. As a result, the output image may be felt unnatural.

The plane images created by the methods disclosed in the Japanese Patent Application Laid-open No. 2002-324249 and Japanese Patent Application Laid-open No. 2002-56407 are reproduced only as a plane image from a specified a single viewpoint in space, without disclosing any correcting unit for such an unnatural plane image.

SUMMARY OF THE INVENTION

It is an object of the present invention to solve at least the above problems in the conventional technology.

An image processing apparatus according to one aspect of the present invention includes an image input unit that inputs binocular stereoscopic image data including plane image data for a left eye and a right eye from an arbitrarily set viewpoint; a plane-image creating unit that creates plane image data based on the binocular stereoscopic image data input; a distance determining unit that determines distances from a single viewpoint at the time of viewing a binocular stereoscopic image based on the binocular stereoscopic image data to each of a plurality of points in a three-dimensional space; an image correcting unit that corrects the plane image data using distance information about the each of the points in the three-dimensional space determined; and an image output unit that outputs the plane image data corrected.

An image processing apparatus according to another aspect of the present invention includes an image input unit that inputs binocular stereoscopic image data including plane image data for a left eye and a right eye from an arbitrarily set viewpoint; a plane-image creating unit that creates plane image data based on the binocular stereoscopic image data input; a distance determining unit that determines distances from a single viewpoint at the time of viewing a binocular stereoscopic image based on the binocular stereoscopic image data to each of a plurality of points in a three-dimensional space; a color-information determining unit that determines color information about the each of the points in the three-dimensional space; an image correcting unit that corrects the plane image data; and an image output unit that outputs the plane image data corrected. The image correcting unit corrects the plane image data using distance information about the each of the points in the three-dimensional space determined and the color information about the each of the points in the three-dimensional space determined.

An image processing apparatus according to still another aspect of the present invention includes an image input unit that inputs binocular stereoscopic image data including plane image data for a left eye and a right eye from an arbitrarily set viewpoint; a plane-image creating unit that creates plane image data based on the binocular stereoscopic image data input; a distance determining unit that determines distances from a single viewpoint at the time of viewing a binocular stereoscopic image based on the binocular stereoscopic image data to each of a plurality of points in a three-dimensional space; a color-information determining unit that determines color information about the each of the points in the three-dimensional space; an object determining unit that determines an attribute of an object in the plane image using distance information about the each of the points in the three-dimensional space determined and the color information about the each of the points in the three-dimensional space determined; an image correcting unit that corrects the plane image data; and an image output unit that outputs the plane image data corrected. The image correcting unit performs a different correction for each of the objects determined by the object determining unit.

An image processing apparatus according to still another aspect of the present invention includes an image input unit that inputs binocular stereoscopic image data including plane image data for a left eye and a right eye from an arbitrarily set viewpoint; a plane-image creating unit that creates plane image data based on the binocular stereoscopic image data input; a distance determining unit that determines distances from a single viewpoint at the time of viewing a binocular stereoscopic image based on the binocular stereoscopic image data to each of a plurality of points in a three-dimensional space; a color-information determining unit that determines color information about the each of the points in the three-dimensional space; an object determining unit that determines an attribute of an object in the plane image using distance information about the each of the points in the three-dimensional space determined and the color information about the each of the points in the three-dimensional space determined; an image-type determining unit that determines an image type based on a spatial layout of each of the objects determined by the object determining unit; an image correcting unit that corrects the plane image data; and an image output unit that outputs the plane image data corrected. The image correcting unit performs a different correction for each of the image types determined.

An image processing apparatus according to still another aspect of the present invention includes an image input unit that inputs binocular stereoscopic image data including plane image data for a left eye and a right eye from an arbitrarily set viewpoint; a plane-image creating unit that creates plane image data based on the binocular stereoscopic image data input; a distance determining unit that determines distances from a single viewpoint at the time of viewing a binocular stereoscopic image based on the binocular stereoscopic image data to each of a plurality of points in a three-dimensional space; a color-information determining unit that determines color information about the each of the points in the three-dimensional space; an object determining unit that determines an attribute of an object in the plane image using distance information about the each of the points in the three-dimensional space determined and the color information about the each of the points in the three-dimensional space determined; a main-object determining unit that determines a main object from among the objects determined by the object determining unit; an image-type determining unit that determines an image type based on a spatial layout of each of the objects determined; an image correcting unit that corrects the plane image data; and an image output unit that outputs the plane image data corrected. The image correcting unit performs a different correction for each of combinations of a type of the main object and the image type.

An image processing method according to still another aspect of the present invention includes inputting binocular stereoscopic image data including plane image data for a left eye and a right eye from an arbitrarily set viewpoint; creating plane image data based on the binocular stereoscopic image data input; determining distances from a single viewpoint at the time of viewing a binocular stereoscopic image based on the binocular stereoscopic image data to each of a plurality of points in a three-dimensional space; correcting the plane image data; and outputting the plane image data corrected. The correcting includes correcting the plane image data using distance information about the each of the points in the three-dimensional space determined.

An image processing method according to still another aspect of the present invention includes inputting binocular stereoscopic image data including plane image data for a left eye and a right eye from an arbitrarily set viewpoint; creating plane image data based on the binocular stereoscopic image data input; determining distances from a single viewpoint at the time of viewing a binocular stereoscopic image based on the binocular stereoscopic image data to each of a plurality of points in a three-dimensional space; determining color information about the each of the points in the three-dimensional space; correcting the plane image data; and outputting the plane image data corrected. The correcting includes correcting the plane image data using distance information about the each of the points in the three-dimensional space determined and the color information about the each of the points in the three-dimensional space determined.

An image processing method according to still another aspect of the present invention includes inputting binocular stereoscopic image data including plane image data for a left eye and a right eye from an arbitrarily set viewpoint; creating plane image data based on the binocular stereoscopic image data input; determining distances from a single viewpoint at the time of viewing a binocular stereoscopic image based on the binocular stereoscopic image data to each of a plurality of points in a three-dimensional space; determining color information about the each of the points in the three-dimensional space; determining an attribute of an object in the plane image using distance information about the each of the points in the three-dimensional space determined and the color information about the each of the points in the three-dimensional space determined; correcting the plane image data; and outputting the plane image data corrected. The correcting includes correcting the plane image data differently for each of the objects determined.

An image processing method according to still another aspect of the present invention includes inputting binocular stereoscopic image data including plane image data for a left eye and a right eye from an arbitrarily set viewpoint; creating plane image data based on the binocular stereoscopic image data input; determining distances from a single viewpoint at the time of viewing a binocular stereoscopic image based on the binocular stereoscopic image data to each of a plurality of points in a three-dimensional space; determining color information about the each of the points in the three-dimensional space; determining an attribute of an object in the plane image using distance information about the each of the points in the three-dimensional space determined and the color information about the each of the points in the three-dimensional space determined; determining an image type based on a spatial layout of each of the objects determined; correcting the plane image data; and outputting the plane image data corrected. The correcting includes correcting the plane image data differently for each of the image types determined.

An image processing method according to still another aspect of the present invention includes inputting binocular stereoscopic image data including plane image data for a left eye and a right eye from an arbitrarily set viewpoint; creating plane image data based on the binocular stereoscopic image data input; determining distances from a single viewpoint at the time of viewing a binocular stereoscopic image based on the binocular stereoscopic image data to each of a plurality of points in a three-dimensional space; determining color information about the each of the points in the three-dimensional space; determining an attribute of an object in the plane image using distance information about the each of the points in the three-dimensional space determined and the color information about the each of the points in the three-dimensional space determined; determining a main object from among the objects determined; determining an image type based on a spatial layout of each of the objects determined; correcting the plane image data; and outputting the plane image data corrected. The correcting includes correcting the plane image data differently for each of combinations of a type of the main object and the image type.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a block diagram of a main part of an image processing apparatus according to a first embodiment of the present invention;

FIG. 2 is a block diagram of a main part of an image processing apparatus according to a second embodiment of the present invention;

FIG. 8A is a schematic for illustrating the images 101 and 102 actually provided to a viewer;

FIG. 8B is a schematic viewed from the top of FIG. 8A;

FIG. 8C is a schematic for illustrating recognition of a convergence angle, binocular parallax, and positions of respective image points in a space;

FIG. 9 is a schematic for illustrating a method of viewing a stereoscopic image using an optical system such as a lenticular lens array or the like;

DETAILED DESCRIPTION

Figure 3:
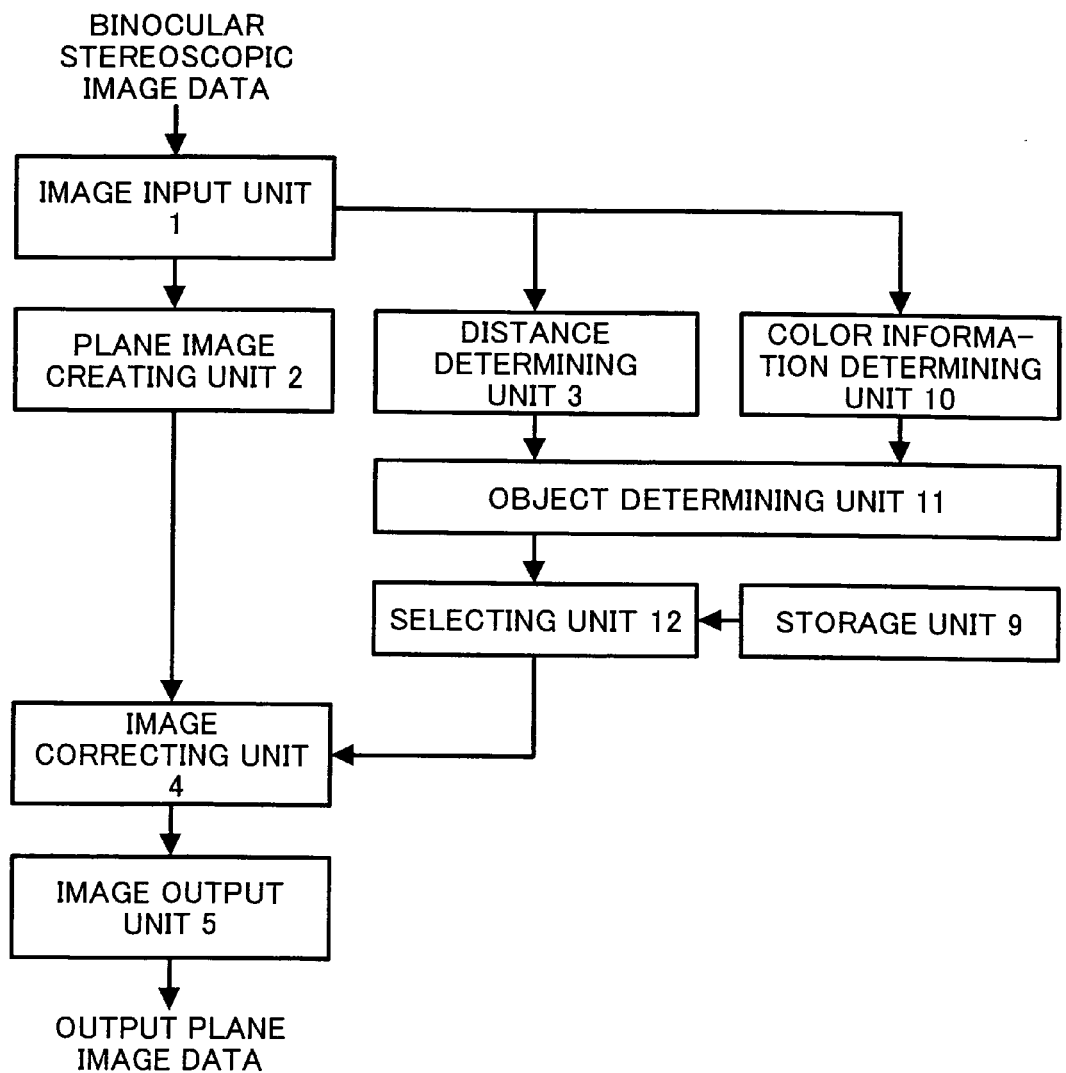
FIG. 3 is a block diagram of a main part of an image processing apparatus according to a third embodiment of the present invention.

Exemplary embodiments of an image processing apparatus and an image processing method according to the present invention are explained in detail with reference to the accompanying drawings.

The image processing apparatus according to an embodiment of the present invention includes an image input unit, a plane-image creating unit, a distance determining unit, an image correcting unit, and an image output unit. The image input unit inputs binocular stereoscopic image data including plane image data for left eye and right eye from an arbitrarily set viewpoint. The plane-image creating unit creates plane image data based on the input binocular stereoscopic image data. The distance determining unit determines distances from a single viewpoint at the time of viewing a binocular stereoscopic image based on the binocular stereoscopic image data to respective points in a three-dimensional space. The image correcting unit corrects the plane image data using distance information about the points in the three-dimensional space determined by the distance determining unit. The image output unit outputs the plane image data. As a result, a more natural plane image having excellent color reproducibility and optimum sharpness can be created easily and swiftly.

FIG. 1 is a block diagram of a main part of an image processing apparatus according to a first embodiment of the present invention. The image processing apparatus according to the first embodiment includes an image input unit 1, a plane-image creating unit 2, a distance determining unit 3, an image correcting unit 4, and an image output unit 5.

The image input unit 1 receives binocular stereoscopic image data including plane image data for left eye and right eye from an arbitrarily set viewpoint as an input.

The binocular stereoscopic image data including the plane image data for left eye and right eye received as the input by the image input unit 1 are specifically explained with reference to the accompanying drawings.

Figure 6:
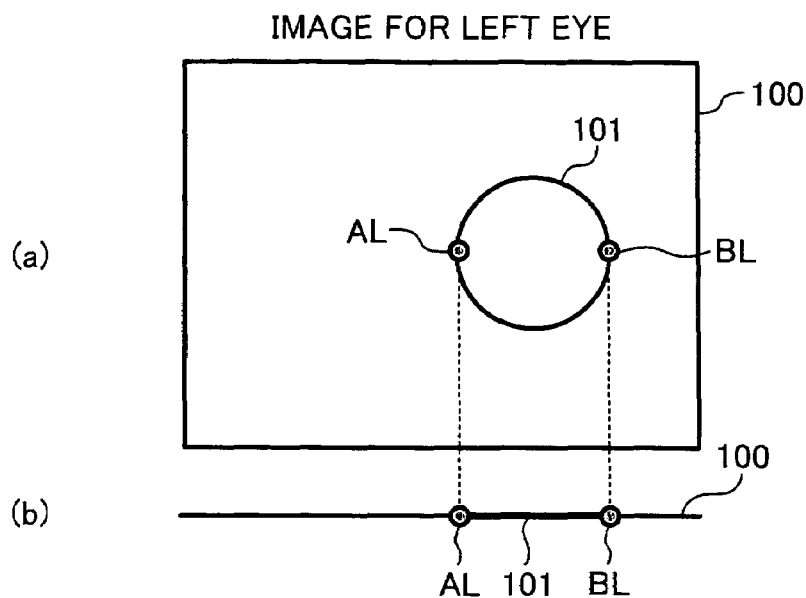
FIG. 6A is a schematic for illustrating an example of an image 101 provided for a left eye.
FIG. 6B is a schematic viewed from the top of FIG. 6A.

FIGS. 6A and 6B are schematic of an example of an image 101 provided for left eye. For simplification, FIGS. 6A and 6B are the diagrams of only a circle 101 (a circle passing through points AL and BL) at different depth positions with respect to a screen 100 in FIG. 6A and a screen 100 in FIG. 6B. FIG. 6A is the diagram when the screen 100 and the circle 101 are viewed from the front, and FIG. 6B is the diagram when FIG. 6A is viewed from the top.

Figure 7:
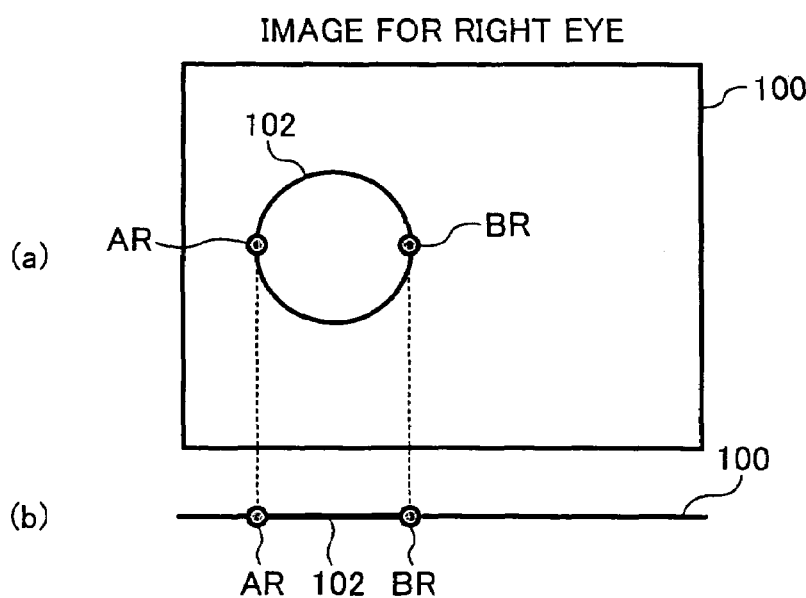
FIG. 7A is a schematic for illustrating an example of an image 102 provided for a right eye.
FIG. 7B is a schematic viewed from the top of FIG. 7A.

FIGS. 7A and 7B are schematics of an example of an image 102 provided for right eye. For simplification, FIGS. 7A and 7B are the diagrams of only a circle 102 (circle passing through points AR and BR) at different depth positions with respect to the screen 100 in FIG. 7A and the screen 100 in FIG. 7B. FIG. 7A is the diagram when the screen 100 and the circle 102 are viewed from the front, and FIG. 7B is the diagram when FIG. 7A is viewed from the top.

FIG. 8A is a schematic for illustrating the images 101 and 102 actually provided to a viewer. In order to present the image 101 for left eye and the image 102 for right eye, respectively, the image 101 for left eye shown in FIG. 6A and the image 102 for right eye shown in FIG. 7A, which are actually presented in FIG. 8A, are presented by different polarized lights. Only the related polarized light is transmitted through each part of a pair of glasses (polarization glasses). A viewer wears the glasses and views the images 101 and 102.

Figure 9:
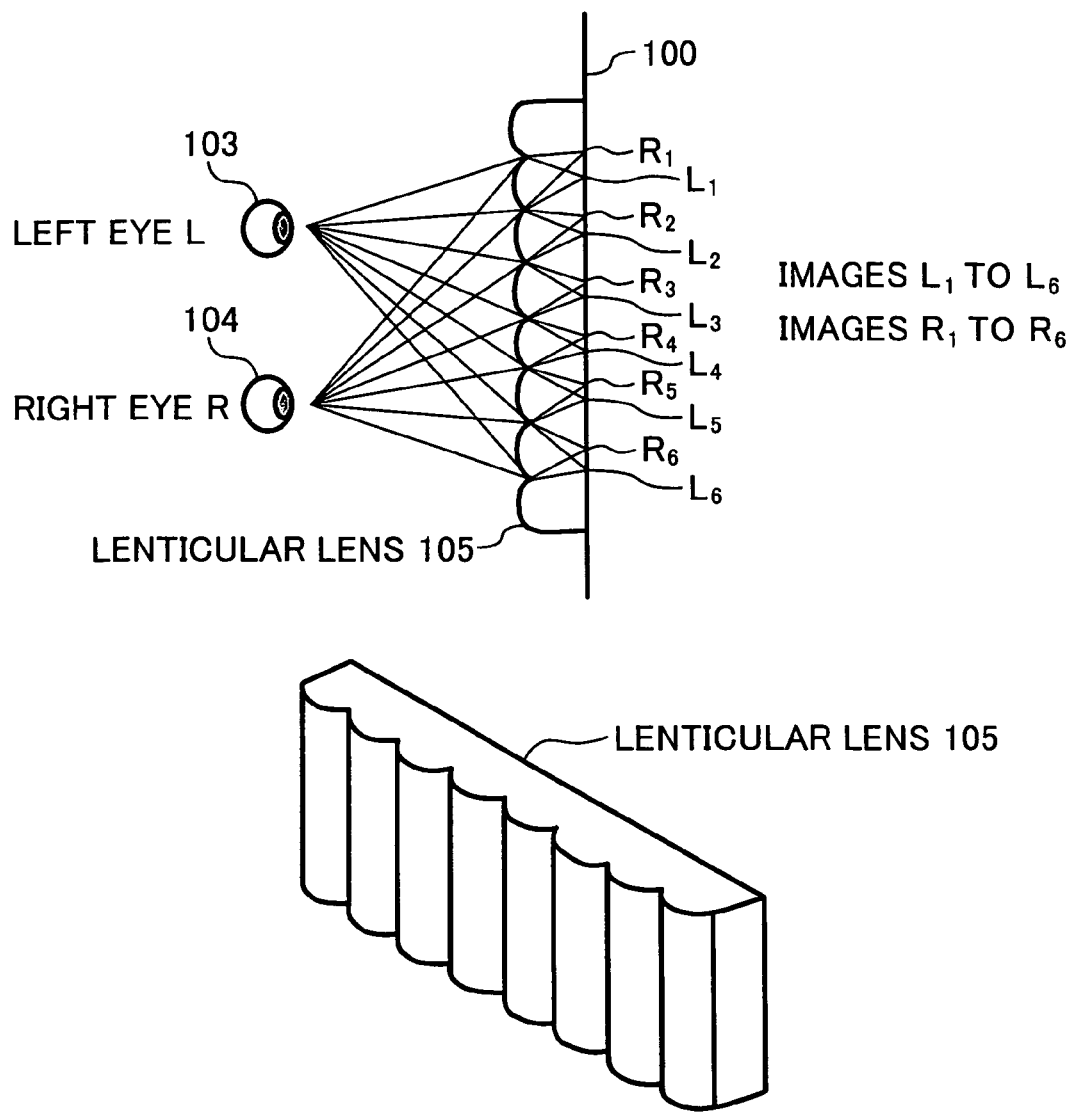
Figure 10:
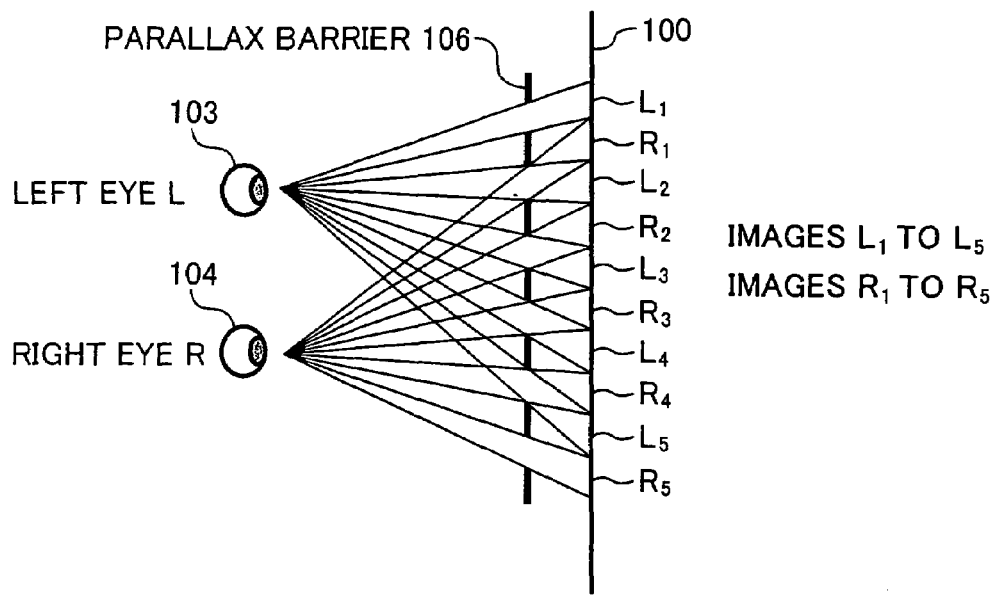
FIG. 10 is a schematic for illustrating a method of viewing a stereoscopic image using a parallax barrier.

As shown in FIG. 9, the images for right and left eyes are divided finely in a lateral direction into rectangles, and areas on the divided rectangles (images $R_1$ to $R_6$ for right eye and images $L_1$ to $L_6$ for left eye: see FIG. 9) are arranged alternatively. They are viewed via an optical system such as a lenticular lens array 105 or the like. As shown in FIG. 10, the images for left and right eyes are divided finely in a lateral direction into rectangles, and areas on the divided rectangles (images $R_1$ to $R_5$ for right eye and images $L_1$ to $L_5$ for left eye:

see FIG. 10) are arranged alternatively. Methods such as viewing via a parallax barrier 106 are generally applied.

FIG. 8B is a schematic of a state where the image 101 and the image 102 shown in FIG. 8A are viewed when FIG. 8A is viewed from the top. As shown in FIG. 8B, since AR and BR are presented for only right eye and AL and BL are presented for only left eye, one stereoscopic circle is viewed at positions represented by A and B (positions in appearance). As is clear from the explanation, the binocular stereoscopic image data include the plane image data for left eye (example: the image 101: see FIGS. 6A, 6B, 8A, 8B, and 8C) and the plane image data for right eye (example: the image 102: see FIGS. 7A 7B, 8A, 8B, and 8C), and these data are presented for the left eye and the right eye of the viewer, respectively. The viewer perceives one image stereoscopically.

As shown in FIG. 8C, angles formed by a left eye 103, a right eye 104, with gazing points X and O are called as convergence angle β and α, respectively. As the convergence angles are larger, the positions in appearance become closer. Further, when the gazing points X and O are present in the same space, a difference between the angle α formed by the gazing point O, the left eye 103, and the right eye 104, and the angle β formed by the gazing point X, the left eye 103, and the right eye 104 is called as binocular parallax. The binocular parallax is used for recognizing the positions of the points X and O in the space.

The distance determining unit 3 calculates a parallactic angle of each related point in the plane image data for left eye and the plane image data for right eye obtained from the viewpoints of the left eye and the right eye that are used as the binocular stereoscopic image data. The distance determining unit 3 calculates relative positions of points in a presented image in a three dimensional space. The image is obtained by presenting the plane image data for left eye and the plane image data for right eye for the left and the right eyes of a viewer, respectively, and is viewed stereoscopically. The three dimensional space includes the presented image.

Figure 11:
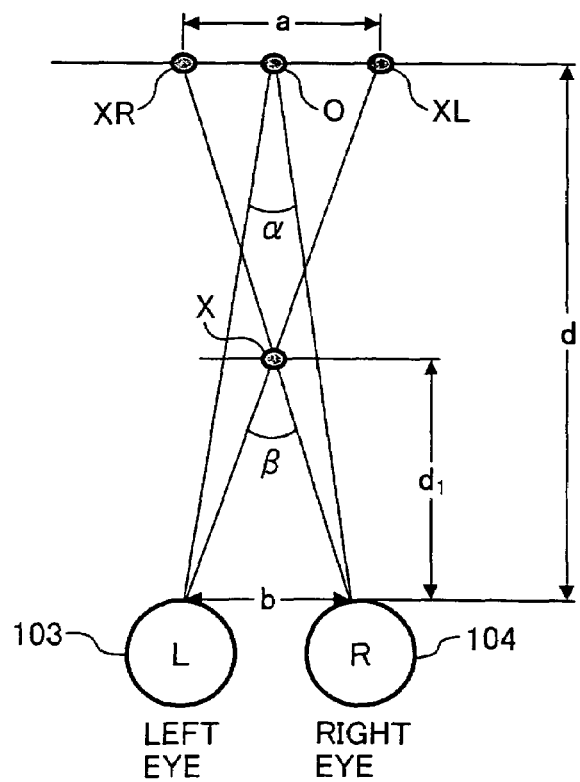
FIG. 11 is a schematic for illustrating the principle in calculating relative positions of the respective image points in a three-dimensional space including an image viewed stereoscopically.

The related points represent points (binocular related points) having a relationship between AR and AL, BR and BL shown in FIGS. 8A to 8C, or XR and XL in FIG. 11. As shown in FIG. 11, when a viewing distance is recognized (d), a distance in appearance $d_1$ to the gazing point X (relative position with respect to O) is obtained according to db/(a+b) where a length of line segment from XR to XL is "a" and a length of line segment LR is b.

For example, the viewer (user) arbitrarily specifies a single viewpoint of the viewer in the three-dimensional space perceived by the viewer using a viewpoint position designating unit or the like (not shown). When the viewpoint of the viewer in the three-dimensional space is determined, the distance determining unit 3 obtains absolute distances between respective points in the three-dimensional space viewed by the viewer and the determined viewpoint based on the binocular stereoscopic image data.

Figure 12:
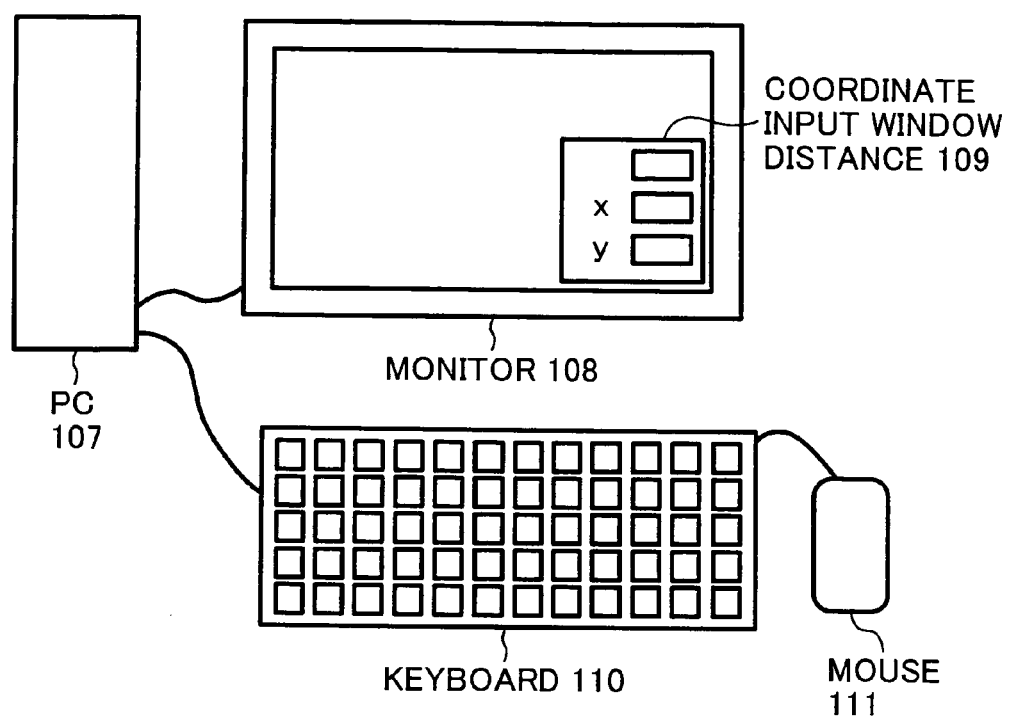
FIG. 12 is a schematic of a first example of a viewpoint position designating unit of the viewer.
Figure 13:
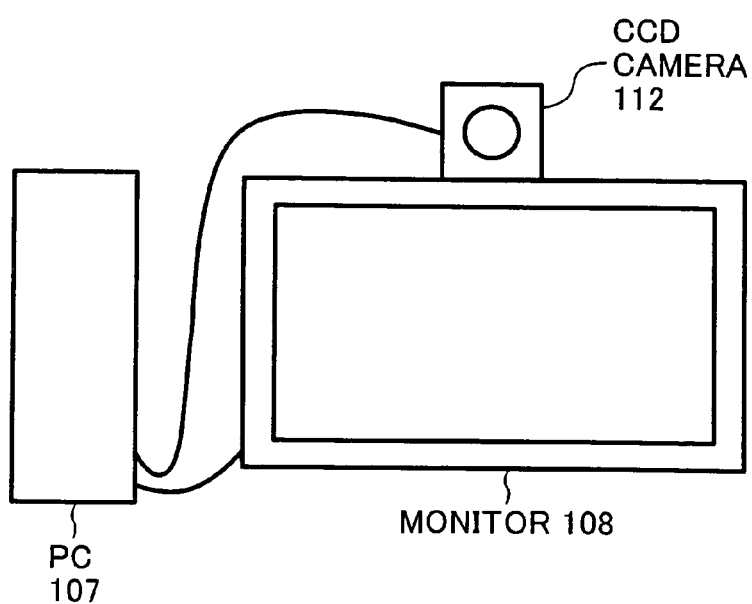
FIG. 13 is a schematic of a second example of the viewpoint position designating unit of the viewer.
Figure 14:
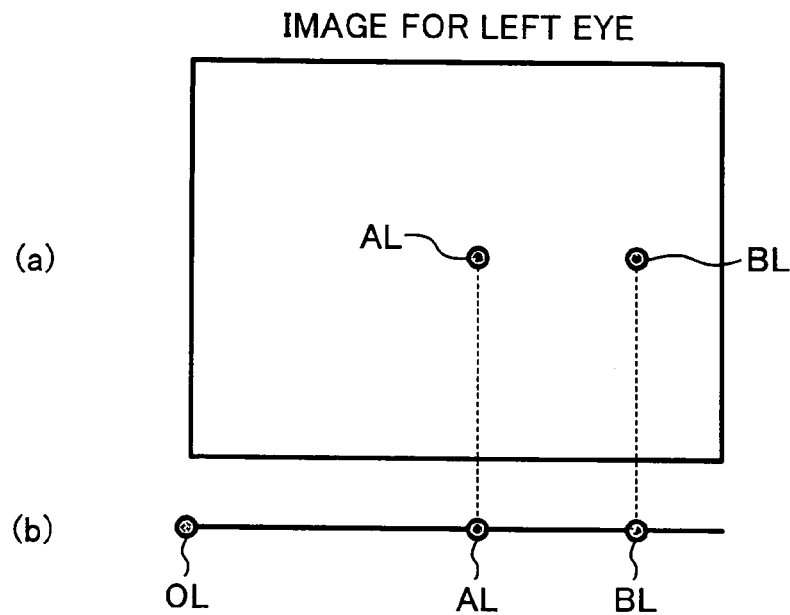
FIGS. 14A and 14B are schematics for illustrating a method of obtaining a point group viewed that the points are equidistant from one another at the time of viewing a binocular stereoscopic image.
Figure 15:
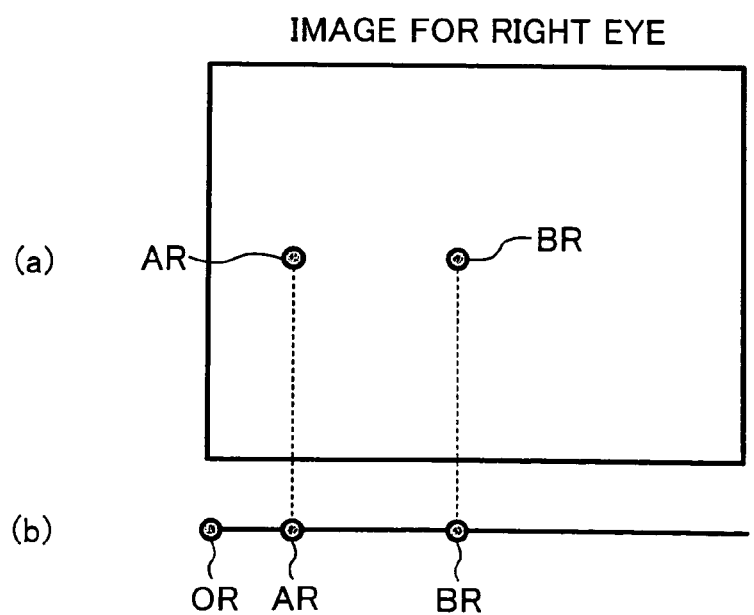
FIGS. 15A and 15B are schematics for illustrating a method of obtaining a point group viewed that the points are equidistant from one another at the time of viewing the binocular stereoscopic image.

The viewpoint position designating unit is explained. FIGS. 12 and 13 are examples of the viewpoint position designating unit. The viewpoint position designating unit shown in FIG. 12 has a personal computer (PC) 107, a monitor 108, a keyboard 110, and a mouse 111. The viewpoint position designating unit inputs a viewing distance of the viewer with respect to the screen and coordinates of the points in the presented image on a plane parallel with the screen with respect to a screen center onto a coordinate input window 109 displayed on the monitor 108 using the keyboard 110. The viewpoint position designating unit shown in FIG. 13 has the PC 107, the monitor 108, and a charge coupled device (CCD) camera 112. The CCD camera 112 is provided to a periphery of the monitor screen, and detects positions of the both eyes of the viewer. One example of a method of detecting the positions of the both eyes of the viewer is explained. The image of eyes are cut out by utilizing that a difference in reflectance between the image of white of the viewer's eye and the image of black of the eye captured by the CCD camera 112 is very large, so that the positions of the both eyes of the viewer are specified. The CCD camera 112 has an automatic focus mechanism, and a distance with respect to the screen is determined by a focus distance.

The plane-image creating unit 2 converts all the input binocular stereoscopic image data into the plane image data from the determined viewpoint using the plane image processing method disclosed in Japanese Patent Application Laid-Open No. 2002-324249. In the plane image processing method, eight or more sets of related points on an image as two-dimensional plane data from two viewpoints, and an arbitrary number of feature lines as line segments representing a feature of the image are specified, so that the viewpoints of the two images are interpolated and an interpolated image is displayed.

The image correcting unit 4 corrects the plane image data obtained by the plane-image creating unit 2 based on the information about the distance between the points in the three-dimensional space and the determined viewpoint determined by the distance determining unit 3. At this time, the same correcting data are used for the point group viewed that the points are equidistant at the time of viewing the binocular stereoscopic image. Different correcting data are used for the point group viewed that distances are different at the time of viewing the binocular stereoscopic image, so that the correction is made.

The point group viewed that the points are equidistant at the time of viewing the binocular stereoscopic image are explained below specifically. The point group viewed that the points are equidistant at the time of viewing the binocular stereoscopic image is a point group where differences between the binocular related points (points having a relationship between AR and AL, BR and BL in FIG. 8A, or XR and XL in FIG. 11) in local coordinate systems of the images for left eye and right eye (for example, the image 101 for left eye shown in FIGS. 6A, 6B, 8A, 8B, and 8C, and the image 102 for right eye shown in FIGS. 7A, 7B, 8A, 8B, and 8C) are equal in a horizontal direction. In FIGS. 14A, 14B, 15A, and 15B, when (AR-OL)–(AR-OR)=(BL-OL)–(BR-OR), AL and BL, or AR and BR are viewed as equidistant.

When the binocular related points on the images for left and right eyes are recognized in advance, data according to (XL-OL)–(XR-OR) are prepared for the point XL in the image for left eye and the related point XR in the image for right eye, respectively. The point group viewed that the points are equidistant can be recognized by referring to the data.

Figure 16:
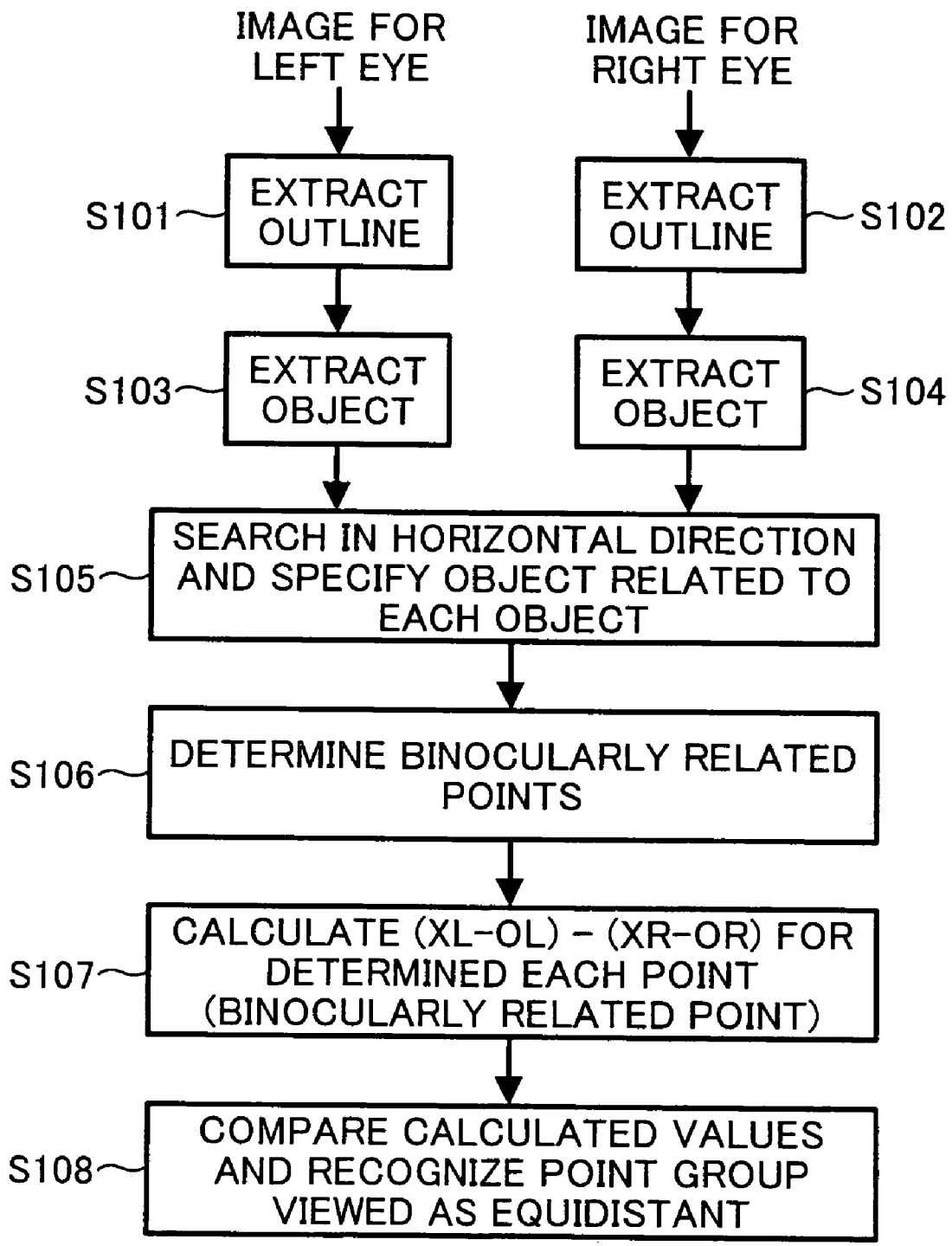
FIG. 16 is a flowchart of a process procedure for obtaining a point group viewed that the points are equidistant from one another at the time of viewing the binocular stereoscopic image.

When the binocular related points in the images for left and right eyes are not recognized in advance, a method of obtaining the point group viewed that the points are equidistant at the time of viewing the binocular stereoscopic image is explained below with reference to FIG. 16. As shown in FIG. 16, a first-order differential filter such as a Sobel filter or a second-order differential filter such as a Laplacian filter are used for the images for left and right eyes, so that outlines are detected (steps S101 and 102). Objects are extracted as closed areas formed by the detected outlines (steps S103 and 104).

Convolution of the objects extracted from any one of the image for left and for right eyes is calculated in a horizontal direction in the same vertical position of the other image. A position where the calculated value is the largest is specified. The object in the specified position is determined as a related object in the related image (step S105). Points whose local coordinates in the related objects equal are determined as the binocular related points (step S106). A calculation is carried out on the determined points according to (XL-OL)–(XR-OR) (step S107). The calculated values obtained in the procedure are compared so that the point group viewed as equidistant can be recognized (step S108).

According to the method, the relative positions of the points at the time of viewing in a depth direction can be recognized (as the values obtained from (XL-OL)–(XR-OR) are larger, the points are closer). A change in color saturation or a change in contrast is a very important factor when a person perceives depth. When the image that should be viewed stereoscopically by both eyes is changed into a two-dimensional image, corrections such as increase in the color saturation of the object to be viewed more closely or increase in the contrast of the object are made, so that a more natural two-dimensional image can be obtained. When, for example, the color saturation is corrected, the corrected color saturation C is a function of the color saturation before correction $C_0$ and a viewing distance D (D>=0), and a function that is continuously attenuated such as $C=C_0 \times P(-D^2/2\sigma^2)$ may be used. In the case of this example, the value $\sigma$ is changed so that a degree of attenuation can be adjusted.

The plan image data corrected by the image correcting unit 4 are output by the image output unit 5. When the image output unit 5 is an image display device such as a monitor, the plane image data are displayed as a plane image on an image display screen of the image display device. When the image output unit 5 is a printing apparatus such as a printer, the plane image data are output as a normal plane image that is not a binocular stereoscopic image onto paper, a sheet for over head projector (OHP), or the like.

When the image correcting process executed in this embodiment is a color correcting process, a surface determined as a distant view, for example includes comparatively fewer high spatial frequency components. For this reason, even if the image is reproduced with a small number of colors, the viewer senses less unnaturalness at the image at the time of viewing, so that a process such that reducing bits of an output pixel value with respect to bits of an input pixel value is executed.

As a result, the plane image to be obtained can be a more natural plane image having excellent color reproducibility due to the color correcting process. Further, the plane image can be obtained easily and swiftly by the process of reducing the bits of the output pixel value with respect to the bits of the input pixel value.

Figure 17:
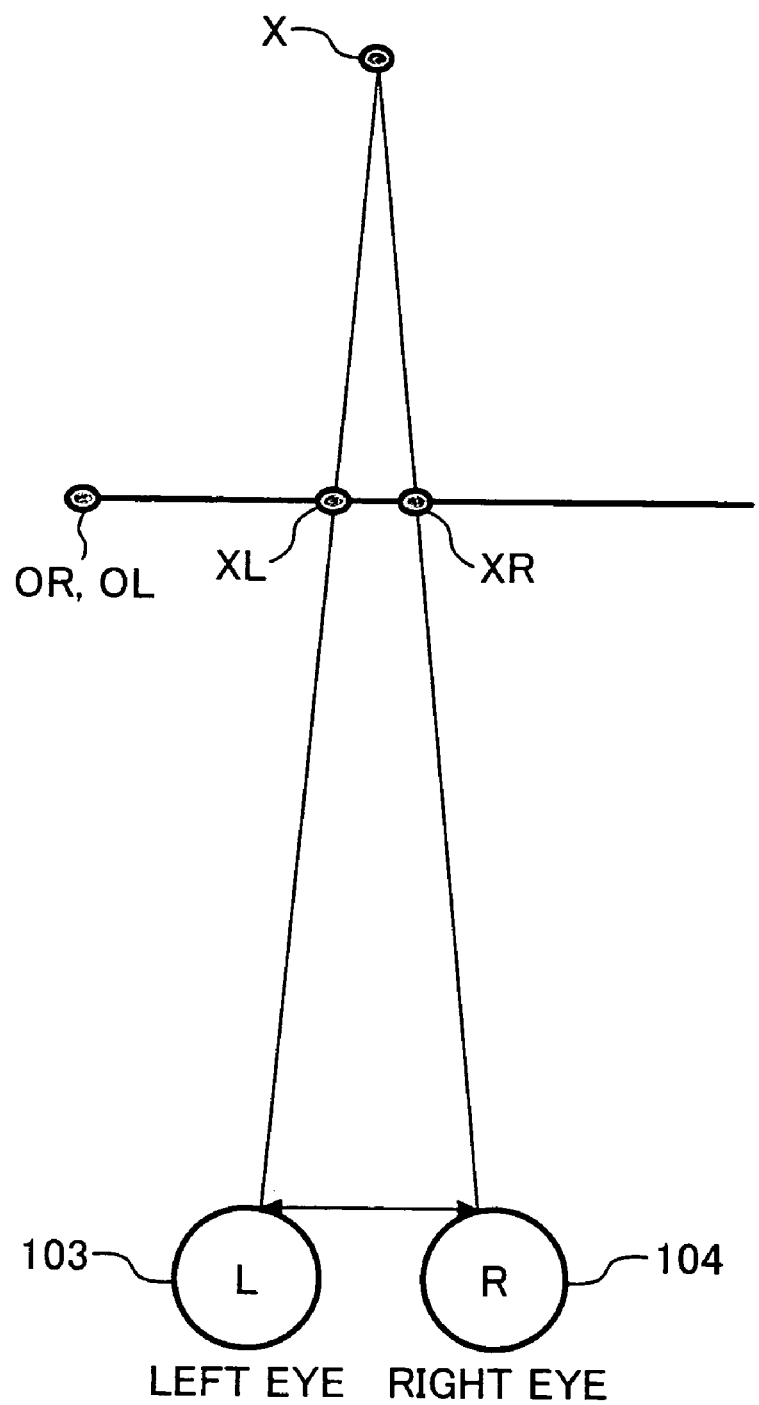
FIG. 17 is a schematic for illustrating a criterion of a surface determined as a distant view and a close view in image data of the stereoscopic image viewed stereoscopically.

A criterion of a surface determined as a distant view is explained specifically. The determination as the distant view is made by referring to the value obtained by (XL-OL)–(XR-OR). As shown in FIG. 17, therefore, the point X viewed to be farther than the monitor surface has the negative value (the value obtained by (XL-OL)–(XR-OR)). While there is no precise criterion for determining whether it is the distant view, when the distances from the points to the monitor surface to be perceived are different from one another by one or more digits, the surface including such a point group may be determined as a distant view.

When the image correcting process executed in this embodiment is a sharpness correcting process, an edge emphasizing process or the like is executed if necessary because a surface determined as a close view, for example, has comparatively many high spatial frequency components.

As a result, the plane image to be obtained can be a more natural plane image having preferable sharpness by the sharpness correcting process.

A criterion for determining whether the surface is the close view is explained specifically. Similarly to the criterion for determining that the surface is the distant view, the determination as to the close view is made by referring to the value of the (XL-OL)–(XR-OR). The point X viewed as being closer than the monitor surface has the positive value (the value of (XL-OL)–(XR-OR)). While there is no precise criterion for determining whether the surface is a close view, but when the distances from the points to the monitor surface to be perceived are different from one another by one or more digits, the surface including such a point group may be determined as the close view.

According to the present embodiment, the distance information from the binocular stereoscopic image data is acquired for the plane image data created by the plane-image creating unit 2. As a result, the correcting process can be executed on the point group viewed that the points are equidistant at the time of viewing the binocular stereoscopic image using the same correcting data. The correcting process can be executed on the point group viewed that the distances of the points are different at the time of binocular stereoscopic image using different correcting data. Various image correcting processes such as color correction and sharpness correction can be executed suitably.

According to the present embodiment, a more natural plane image that has excellent color reproducibility and optimal sharpness can be created easily and swiftly.

FIG. 2 is a block diagram of a main part of an image processing apparatus according to a second embodiment of the present invention. The image processing apparatus according to the second embodiment includes an image input unit 1, a plane-image creating unit 2, a distance determining unit 3, an image correcting unit 4, an image output unit 5, a storage unit 6, a distance-range determining unit 7, and a selecting unit 8.

The image input unit 1 receives binocular stereoscopic image data including plane image data for left eye and right eye from an arbitrary set viewpoint, for example, as an input.

The distance determining unit 3 uses the binocular stereoscopic image data so as to calculate a parallactic angle formed by the related points in the binocular stereoscopic image data from the viewpoints of the plane image data for left eye and right eye. The distance determining unit 3 calculates relative positions of the points of the binocular stereoscopic image data in the three-dimensional space.

For example, the viewpoint in the three-dimensional space is determined in such a manner that a user arbitrarily specifies a single viewpoint to be perceived in the three-dimensional space using a viewpoint position designating unit or the like (not shown). The distance determining unit 3, thereafter, obtains absolute distances between the points in the three-dimensional space based on the binocular stereoscopic image data and the determined viewpoint.

The plane-image creating unit 2 converts all the input binocular stereoscopic image data into the plane image data from the determined viewpoint according to the aforementioned plane image processing method.

The storage unit 6 stores a plurality of correcting data corresponding to distance ranges to be viewed such as very short distance, short distance, middle distance, long distance, and very long distance. The correction using the correcting data corresponding to the distance ranges to be viewed (in other words, the correction using a continuous function according to distance) means a look-up table (LUT) operation using a prepared correcting table with several levels. This correction simplifies the data process.

The distance-range determining unit 7 determines which of the points on the binocular stereoscopic image data from a single viewpoint at the time of viewing the binocular stereoscopic image based on the binocular stereoscopic image data belongs to which of the distance ranges.

The selecting unit 8 selects correcting data corresponding to the distance ranges of the points determined by the distance-range determining unit 7 from the correcting data stored in the storage unit 6. A method in which the selecting unit 8 selects correcting data corresponding to the distance ranges of the points determined by the distance-range determining unit 7 from the correcting data stored in the storage unit 6 is explained specifically.

As to the distance ranges, the very short distance (0 to a), the short distance (a to b), the middle distance (b to c), the long distance (c to d), and the very long distance (d and subsequently) are set. A determination is made which of distance ranges the distance (D) where the point is viewed belongs to. Specifically, any one of a, b, c, and d is compared with D, and comparison is repeated until D becomes smaller than any one of a, b, c, and d, so that a distance range to which D belongs is determined. When D is larger than d, D is determined as the very long distance. The correcting data corresponding to the determined distance is referred to, and an address of the correcting data is referred to so that the correcting data are obtained from the storage unit 6.

The image correcting unit 4 executes the correcting process on the plane image data created by the plane-image creating unit 2 using the correcting data selected by the selecting unit 8. The plane image data corrected by the image correcting unit 4 are output by the image output unit 5.

When the image correcting process executed in this embodiment is the color correcting process, the correcting data corresponding to the distance ranges to be viewed are a LUT that is used when an input pixel value is converted into an output pixel value. As the distance is longer at the time of viewing the image, a mapping interval may be rougher. As a result, the plane image to be obtained can be a more natural plane image having excellent color reproducibility by the color correcting process. As the distance is longer at the time of viewing the image, the mapping interval may be rough. For this reason, the plane image can be obtained easily and swiftly by a process of decreasing bits of the output pixel value with respect to the bits of the input pixel value.

The LUT is explained below. For example, in the LUT that is used for correcting color saturation, when the corrected color saturation is C, the color saturation before correction is $C_0$, and the viewing distance is a function of D (D>=0), a function that is continuously attenuated like $C=C_0 \exp(-D^2/2\sigma^2)$ can be used. In this case, the value D is roughly set so as to be divided into five levels, and thus the value C obtained after the correction can be obtained as roughly calculated results with five levels.

As one example of the LUT using the function, a unit of the distance is m, $\sigma=100$, a relationship between the distance range and set distance is set to (very short distance (0 to 0.3)>1, short distance (0.3 to 1)>0.999, the middle distance (1 to 10)>0.999, the long distance (10 to 100)>0.995, the very long distance (100 m and subsequently)>0.607). The LUT can be constituted in such a manner.

When the image correcting process executed in this embodiment is the sharpness correcting process, the correcting data corresponding to the distance ranges to be viewed are, for example, an edge enhancing filter. A degree of the edge enhancement is increased for the distance range determined as the short distance. Accordingly, the plane image to be obtained can be a more natural plane image having preferable sharpness by the sharpness correcting process.

According to the present embodiment, the determination can be made which of the points on the binocular stereoscopic image data belongs to which of the distance ranges to be viewed. The correcting data corresponding to the distance ranges of the points in the three-dimensional space are selected from the stored correcting data. Various corrections such as the color correction and the sharpness correction can be suitably made on the plane image data by the correcting data.

According to the present embodiment, therefore, the more natural plane image having excellent color reproducibility and optimal sharpness can be created easily and swiftly.

FIG. 3 is a block diagram of a main part of an image processing apparatus according to a third embodiment of the present invention. The image processing apparatus according to the third embodiment includes an image input unit 1, a plane-image creating unit 2, a distance determining unit 3, the image correcting unit 4, an image output unit 5, a storage unit 9, a color-information determining unit 10, an object determining unit 11, and a selecting unit 12.

The image input unit 1 receives binocular stereoscopic image data including image data for left eye and right eye from an arbitrarily set viewpoint, for example, as an input.

The distance determining unit 3 uses the binocular stereoscopic image data so as to calculate a parallactic angle of the related points in the binocular stereoscopic image data from the viewpoints on the plane image data for left eye and right eye. The distance determining unit 3 calculates relative positions of the points of the binocular stereoscopic image data in the three-dimensional space.

When the viewpoint in the three-dimensional space is determined as a user arbitrarily specifies a single viewpoint in the three-dimensional space to be perceived using the viewpoint position designating unit or the like (not shown), the distance determining unit 3 obtains absolute distances between the points in the three-dimensional space based on the binocular stereoscopic image data and the determined viewpoint.

The plane-image creating unit 2 converts all the input binocular stereoscopic image data into the plane image data from the determined viewpoints using the aforementioned plane image processing method.

The storage unit 9 stores a plurality of color correcting data corresponding to so-called memorized colors such as colors of people's skin, color of leaves, and color of blue sky that people conceive as ideas as colors of certain objects. The memorized colors that people conceive as ideas means colors related to certain objects such as skin, leaves, and blue sky in their memories, which are stem from the environment, the culture, the geography, and the race of one's growth process.

The object determining unit 11 determines whether the objects in the plane image data are the specified objects using the information about distances of the points in the three-dimensional space determined by the distance determining unit 3, and information about the color saturation of the points in the three-dimensional space determined by the color-information determining unit 10.

The selecting unit 12 selects color correcting data corresponding to the determined objects from the color correcting data stored in the storage unit 9.

The image correcting unit 4 makes a suitable color correction on the plane image data created by the plane-image creating unit 2 using the color correcting data selected by the selecting unit 9 for each object. The plane image data corrected by the image correcting unit 4 are output by the image output unit 5.

According to the present embodiment, the determination can be made based on the binocular stereoscopic image data whether the objects in the plane image data are the specified objects such as the stored colors of the people's skin by the distance information and the color information about the points in the three dimensional space.

The objects are extracted by the distance information about the points in the three-dimensional space calculated based on the binocular stereoscopic image data so that the colors and the shapes of the objects become clear. When the method disclosed in Japanese Patent Application Laid-Open No. 2000-048184 is used, for example, the extracted objects can be clearly determined such as a face or a leaf.

The color correcting data corresponding to the objects are selected from the stored color correcting data, and the suitable color correction can be made on the plane image data for each object by the selected color correcting data.

Namely, when a certain object is determined as a person's skin, an address of the correcting data corresponding to the determined object (skin) is referred to so that the color correcting data corresponding to the determined object are selected from the stored color correcting data and are obtained. The suitable color correction can be made on the plane image data for each object by the selected color correcting data.

According to the present embodiment, therefore, a more natural plane image having excellent color reproducibility where people's memorized colors are taken into consideration can be created easily and swiftly.

Figure 4:
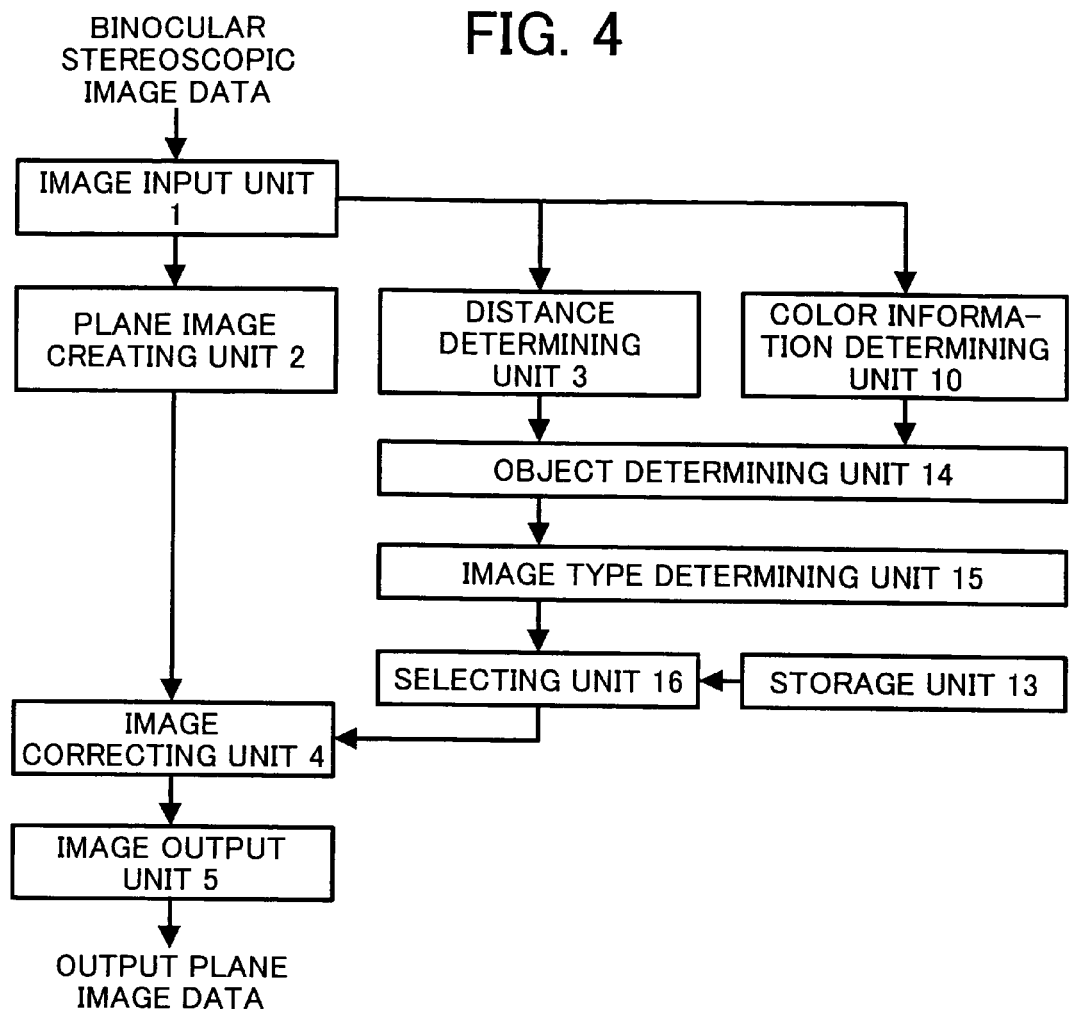
FIG. 4 is a block diagram of a main part of an image processing apparatus according to a fourth embodiment of the present invention.
Figure 5:
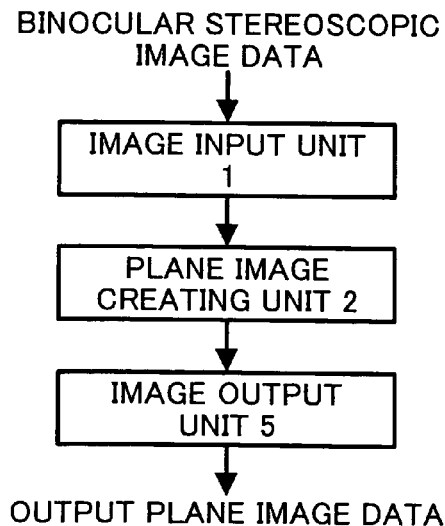
FIG. 5 is a block diagram of a main part of a conventional image processing apparatus.

FIG. 4 is a block diagram of a main part of an image processing apparatus according to a fourth embodiment of the present invention. The image processing apparatus according to the fourth embodiment includes an image input unit 1, a plane-image creating unit 2, a distance determining unit 3, an image correcting unit 4, an image output unit 5, a color-information determining unit 10, a storage unit 13, an object determining unit 14, an image-type determining unit 15, and a selecting unit 16.

The image input unit 1 receives binocular stereoscopic image data including plane image data for left eye and right eye from an arbitrarily set viewpoint, for example, as an input.

The distance determining unit 3 calculates a parallactic angle of the related points on the binocular stereoscopic image data from the viewpoints on the plane image data for left eye and right eye using the binocular stereoscopic image data. The distance determining unit 3 calculates relative positions of the points of the binocular stereoscopic image data in the three-dimensional space.

A user specifies an arbitrary point in the three-dimensional space to be perceived using the viewpoint position designating unit or the like, not shown, so that the viewpoint in the three-dimensional space is determined. The distance determining unit 3 obtains absolute distances between the points in the three-dimensional space based on the binocular stereoscopic image data and the determined viewpoint.

The plane-image creating unit 2 converts all the input binocular stereoscopic image data into the plane image data from the determined viewpoint using the aforementioned plane image processing method.

The storage unit 13 stores a plurality of color correcting data corresponding to image types composed of various combinations of certain objects such as colors of people's skin, colors of leaves, color of blue sky that are memorized by people.

Since colors of skin such as skin at the time of fine weather and skin at the time of cloudy weather are different according to viewers who feel preferable, a correction table including the correcting data corresponding to these colors is prepared as the color correcting data. Alternatively, the color of skin of a person in front of green leaves is seen differently from the actual color of the skin due to an effect of color contrast. In this case, a preferable image can be obtained by correcting the skin color. Accordingly, color correcting data for correcting different colors are prepared for some combinations such as "person and fine weather", "person and cloudy weather", "person and leaf", "person and room interior", and "person and outside at night".

The object determining unit 14 determines whether the objects in the plane image data are the specified objects. At this time, the distance information about the points in the three-dimensional space determined by the distance determining unit 3 and the color information about the points in the three-dimensional space determined by the color-information determining unit 10 are used.

The objects are extracted by the distance information about the points in the three-dimensional space calculated based on the binocular stereoscopic image data, so that the color information about the objects becomes clear. The extracted object can be determined as, for example, a face or a leaf by the method disclosed in Japanese Patent Application Laid-Open No. 2000-048184.

The image-type determining unit 15 determines an image type according to a spatial arrangement of the determined objects. The spatial arrangement of the determined objects are detected by referring to the value obtained from (XL-OL)–(XR-OR) as explained with reference to FIGS. 14A to 16. The objects are determined based on the distance information about the spatial arrangement of the detected objects. When a target image falls under any one of the combinations "person and fine weather", "person and cloudy weather", "person and leaf", "person and room interior", and "person and outside at night" as the combination of "foreground and background", the prepared color correcting data for making different color corrections are referred to so that the color is corrected.

The selecting unit 16 selects correcting data corresponding to the image type determined from the correcting data stored in the storage unit 13.

The image correcting unit 4 makes a suitable color correction corresponding to the type of the image to be processed on the plane image data created by the plane-image creating unit 2 using the color correcting data selected by the selecting unit 16. The plane image data corrected by the image correcting unit 4 are output by the image output unit 5.

According to the present embodiment, the determination is made whether the objects in the plane image data are the specified objects such as the recorded colors of people's skin by the distance information and the color information about the points in the three-dimensional space based on the binocular stereoscopic image data. The image types of the objects can be determined according to the spatial layout of the determined objects.

The color correcting data corresponding to the image types determined from the stored color correcting data are selected, and suitable color corrections can be made on the plane image data by the selected color correcting data for each image type.

According to the present embodiment, therefore, a more natural plane image having excellent color reproducibility in which the image type is taken into consideration can be created easily and swiftly.

While the image processing apparatus according to the first to the fourth embodiments of the present invention is explained above, the constitution of the image processing apparatus, the procedure of the image process, the contents of the image correction, and the like can be suitably changed within the spirit of the present invention and the object of the image processing apparatus.

According to the present invention, various image corrections are made on the plane image data created by the plane-image creating unit 2 based on the distance information obtained from the binocular stereoscopic image data. As a result, a more natural plane image having excellent color reproducibility and optimal sharpness, in which people's memorized colors, types of images, and types of main objects are taken into consideration, can be created easily and swiftly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   an image input unit that inputs binocular stereoscopic image data including plane image data for a left eye and a right eye from an arbitrarily set viewpoint;
   a plane-image creating unit that creates plane image data based on the binocular stereoscopic image data input;
   a distance determining unit that determines distances from a single viewpoint at the time of viewing a binocular stereoscopic image based on the binocular stereoscopic image data to each of a plurality of points in a three-dimensional space;
   an image correcting unit that corrects the plane image data using distance information about the each of the points in the three-dimensional space determined;
   an image output unit that outputs the plane image data corrected;
   a storage unit that stores the correcting data corresponding to a plurality of distance ranges to be viewed;
   a distance-range determining unit that determines which of the points in the three-dimensional space belongs to which of the distance ranges to be viewed from a single viewpoint at the time of viewing the binocular stereoscopic image based on the binocular stereoscopic image data; and
   a selecting unit that selects the correcting data corresponding to the distance ranges of the points in the three-dimensional space determined by the distance-range determining unit from among the correcting data stored, wherein
   the image correcting unit corrects the plane image data using the correcting data selected.

2. The image processing apparatus according to claim 1, wherein the image correcting unit corrects the plane image data using different correcting data for the each of the points in the three-dimensional space with a different distance.

3. The image processing apparatus according to claim 1, wherein the image correcting unit performs a color correction.

4. The image processing apparatus according to claim 1, wherein the image correcting unit performs a sharpness correction.

5. An image processing apparatus comprising:
   an image input unit that inputs binocular stereoscopic image data including plane image data for a left eye and a right eye from an arbitrarily set viewpoint;
   a plane-image creating unit that creates plane image data based on the binocular stereoscopic image data input;
   a distance determining unit that determines distances from a single viewpoint at the time of viewing a binocular stereoscopic image based on the binocular stereoscopic image data to each of a plurality of points in a three-dimensional space;
   a color-information determining unit that determines color information about the each of the points in the three-dimensional space;
   an object determining unit that determines an attribute of an object in the plane image using distance information about the each of the points in the three-dimensional space determined and the color information about the each of the points in the three-dimensional space determined;
   an image correcting unit that corrects the plane image data;
   an image output unit that outputs the plane image data corrected;
   a storage unit that stores correcting data corresponding to a plurality of the objects determined; and
   a selecting unit that selects the correcting data corresponding to the object determined from among the correcting data stored, wherein
   the image correcting unit performs a different correction for each of the objects determined by the object determining unit, and
   the image correcting unit corrects the plane image data using the correcting data selected.

6. The image processing apparatus according to claim 5, wherein the image correcting unit performs a color correction.

7. The image processing apparatus according to claim 6, wherein the image correcting unit performs the color correction based on a color that is ideally conceived by human beings with a specific object.

8. An image processing apparatus comprising:
   an image input unit that inputs binocular stereoscopic image data including plane image data for a left eye and a right eye from an arbitrarily set viewpoint;
   a plane-image creating unit that creates plane image data based on the binocular stereoscopic image data input;
   a distance determining unit that determines distances from a single viewpoint at the time of viewing a binocular stereoscopic image based on the binocular stereoscopic image data to each of a plurality of points in a three-dimensional space;
   a color-information determining unit that determines color information about the each of the points in the three-dimensional space;
   an object determining unit that determines an attribute of an object in the plane image using distance information about the each of the points in the three-dimensional space determined and the color information about the each of the points in the three-dimensional space determined;
   an image-type determining unit that determines an image type based on a spatial layout of each of the objects determined by the object determining unit;
   an image correcting unit that corrects the plane image data;
   an image output unit that outputs the plane image data corrected;
   a storage unit that stores correcting data corresponding to a plurality of the image types determined; and
   a selecting unit that selects the correcting data corresponding to the image type determined from among the correcting data stored, wherein the image correcting unit performs a different correction for each of the image types determined, and the image correcting unit corrects the plane image data using the correcting data selected.

9. The image processing apparatus according to claim 8, wherein the image correcting unit performs a color correction.

10. An image processing apparatus comprising:
an image input unit that inputs binocular stereoscopic image data including plane image data for a left eye and a right eye from an arbitrarily set viewpoint;
a plane-image creating unit that creates plane image data based on the binocular stereoscopic image data input;
a distance determining unit that determines distances from a single viewpoint at the time of viewing a binocular stereoscopic image based on the binocular stereoscopic image data to each of a plurality of points in a three-dimensional space;
a color-information determining unit that determines color information about the each of the points in the three-dimensional space;
an object determining unit that determines an attribute of an object in the plane image using distance information about the each of the points in the three-dimensional space determined and the color information about the each of the points in the three-dimensional space determined;
a main-object determining unit that determines a main object from among the objects determined by the object determining unit;
an image-type determining unit that determines an image type based on a spatial layout of each of the objects determined;
an image correcting unit that corrects the plane image data; and
an image output unit that outputs the plane image data corrected, wherein
the image correcting unit performs a different correction for each of combinations of a type of the main object and the image type.

11. The image processing apparatus according to claim 10, further comprising:
a storage unit that stores correcting data corresponding to a plurality of the combinations;
a selecting unit that selects the correcting data corresponding to the combination of the type of the main object determined and the image type determined from among the correcting data stored, wherein
the image correcting unit corrects the plane image data using the correcting data selected.

12. The image processing apparatus according to claim 10, wherein the image correcting unit performs a color correction.

13. The image processing apparatus according to claim 12, wherein when the main object determined is a specific object, the image correcting unit performs the color correction based on a color that is ideally conceived by human beings with the specific object.

14. An image processing method comprising:
inputting binocular stereoscopic image data including plane image data for a left eye and a right eye from an arbitrarily set viewpoint;
creating plane image data based on the binocular stereoscopic image data input;
determining distances from a single viewpoint at the time of viewing a binocular stereoscopic image based on the binocular stereoscopic image data to each of a plurality of points in a three-dimensional space;
correcting the plane image data, using a processor;
outputting the plane image data corrected;
storing the correcting data corresponding to a plurality of distance ranges to be viewed;
determining which of the points in the three-dimensional space belongs to which of the distance ranges to be viewed from a single viewpoint at the time of viewing the binocular stereoscopic image based on the binocular stereoscopic image data; and
selecting the correcting data corresponding to the distance ranges of the points in the three-dimensional space determined from among the correcting data stored, wherein
the correcting includes correcting the plane image data using distance information about the each of the points in the three-dimensional space determined, and
the correcting includes correcting the plane image data using the correcting data selected.

15. The image processing method according to claim 14, wherein the correcting includes correcting the plane image data using different correcting data for the each of the points in the three-dimensional space with a different distance.

16. The image processing method according to claim 14, wherein the correcting includes correcting a color of the image data.

17. The image processing method according to claim 14, wherein the correcting includes correcting a sharpness of the image data.

18. An image processing method comprising:
inputting binocular stereoscopic image data including plane image data for a left eye and a right eye from an arbitrarily set viewpoint;
creating plane image data based on the binocular stereoscopic image data input;
determining distances from a single viewpoint at the time of viewing a binocular stereoscopic image based on the binocular stereoscopic image data to each of a plurality of points in a three-dimensional space;
determining color information about the each of the points in the three-dimensional space;
determining an attribute of an object in the plane image using distance information about the each of the points in the three-dimensional space determined and color information about the each of the points in the three-dimensional space determined, using a processor;
correcting the plane image data;
outputting the plane image data corrected;
storing correcting data corresponding to a plurality of the objects determined; and
selecting the correcting data corresponding to the object determined from among the correcting data stored, wherein
the correcting includes correcting the plane image data differently for each of the objects determined, and
the correcting includes correcting the plane image data using the correcting data selected.

19. The image processing method according to claim 18, wherein the correcting includes correcting a color of the image data.

20. The image processing method according to claim 19, wherein the correcting includes correcting the color of the image data based on a color that is ideally conceived by human beings with a specific object.

21. An image processing method comprising:
inputting binocular stereoscopic image data including plane image data for a left eye and a right eye from an arbitrarily set viewpoint;
creating plane image data based on the binocular stereoscopic image data input;
determining distances from a single viewpoint at the time of viewing a binocular stereoscopic image based on the binocular stereoscopic image data to each of a plurality of points in a three-dimensional space;
determining color information about the each of the points in the three-dimensional space;
determining an attribute of an object in the plane image using distance information about the each of the points in the three-dimensional space determined and color information about the each of the points in the three-dimensional space determined, using a processor;
determining an image type based on a spatial layout of each of the objects determined;
correcting the plane image data;
outputting the plane image data corrected;
storing correcting data corresponding to a plurality of the image types determined; and
selecting the correcting data corresponding to the image type determined from among the correcting data stored, wherein
the correcting includes correcting the plane image data differently for each of the image types determined, and
the correcting includes correcting the plane image data using the correcting data selected.

22. The image processing method according to claim 21, wherein the correcting includes correcting a color of the image data.

23. An image processing method comprising:
inputting binocular stereoscopic image data including plane image data for a left eye and a right eye from an arbitrarily set viewpoint;
creating plane image data based on the binocular stereoscopic image data input;
determining distances from a single viewpoint at the time of viewing a binocular stereoscopic image based on the binocular stereoscopic image data to each of a plurality of points in a three-dimensional space;
determining color information about the each of the points in the three-dimensional space;
determining an attribute of an object in the plane image using distance information about the each of the points in the three-dimensional space determined and color information about the each of the points in the three-dimensional space determined, using a processor;
determining a main object from among the objects determined;
determining an image type based on a spatial layout of each of the objects determined;
correcting the plane image data;
outputting the plane image data corrected;
storing correcting data corresponding to a plurality of the combinations; and
selecting the correcting data corresponding to the combination of the type of the main object determined and the image type determined from among the correcting data stored, wherein
the correcting includes correcting the plane image data differently for each of combinations of a type of the main object and the image type, and
the correcting includes correcting the plane image data using the correcting data selected.

24. The image processing method according to claim 23, wherein the correcting includes correcting a color of the image data.

25. The image processing method according to claim 24, wherein when the main object determined is a specific object, the correcting includes correcting the color of the image data based on a color that is ideally conceived by human beings with a specific object.

* * * * *